Dec. 29, 1925.
F. J. TARR
1,568,007
OIL BURNER
Original Filed Feb. 26, 1924  2 Sheets-Sheet 1
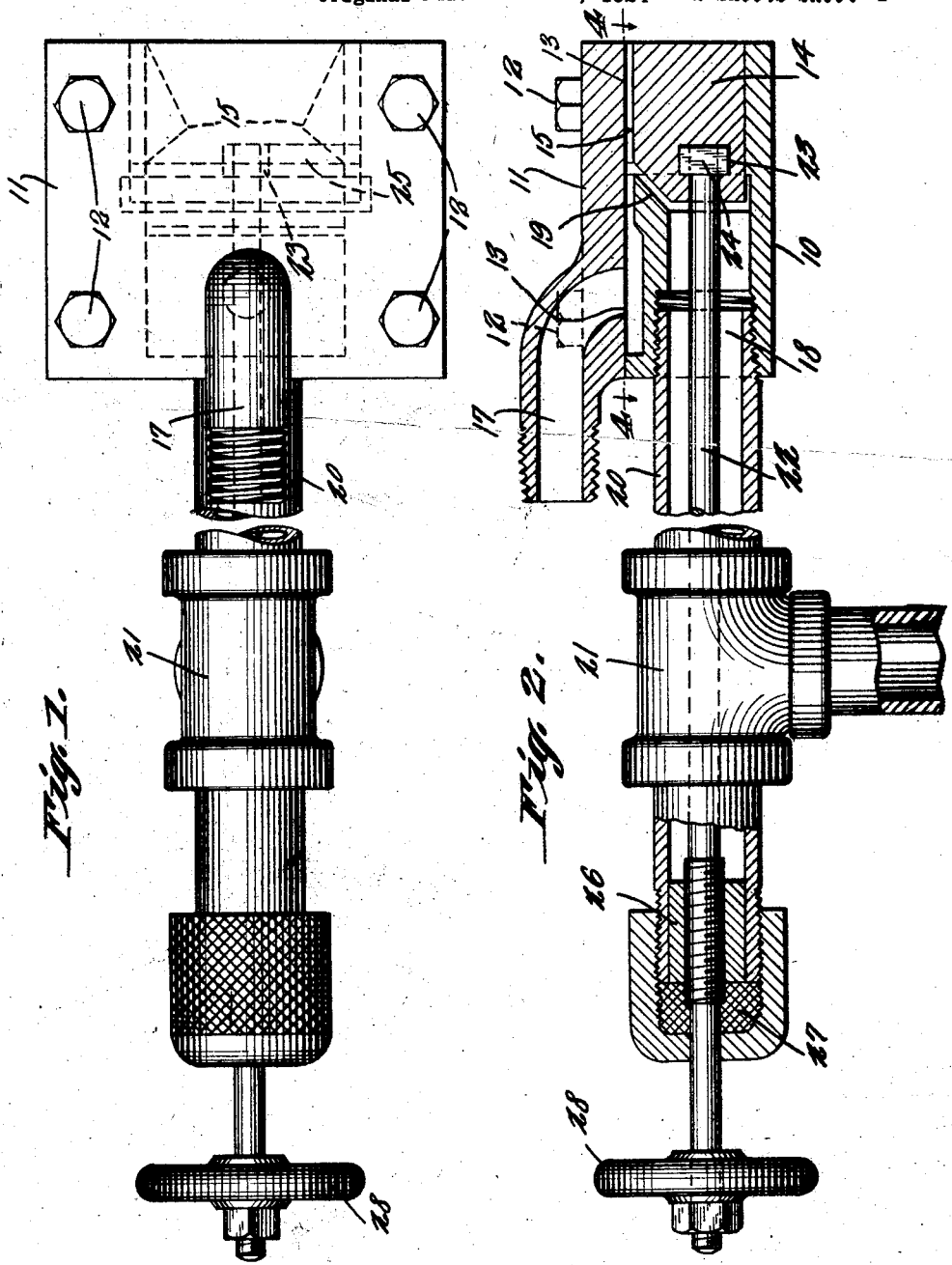

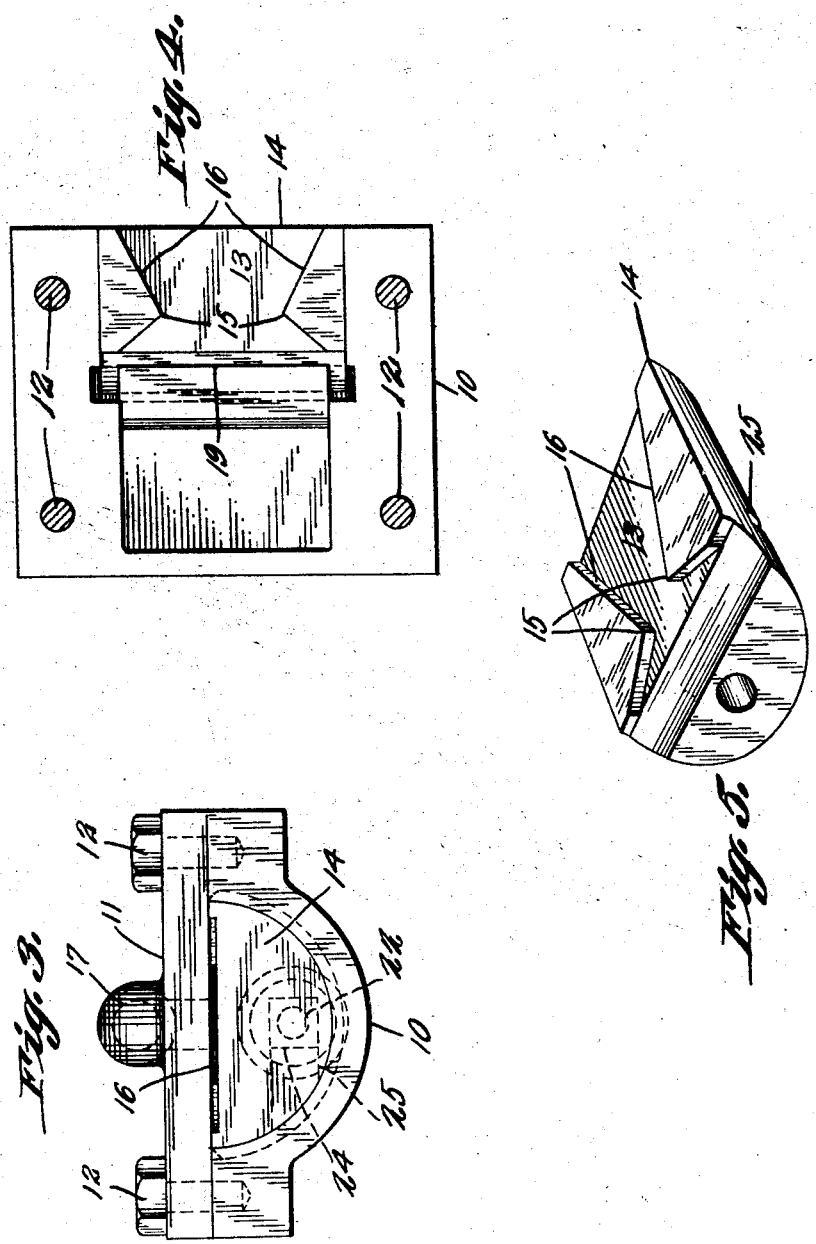

Patented Dec. 29, 1925.

1,568,007

UNITED STATES PATENT OFFICE.

FRANK J. TARR, OF TULSA, OKLAHOMA.

OIL BURNER.

Application filed February 26, 1924, Serial No. 695,322. Renewed September 30, 1925.

*To all whom it may concern:*

Be it known that I, FRANK J. TARR, a citizen of the United States, residing at Tulsa, in the county of Tulsa and State of Oklahoma, have invented new and useful Improvements in Oil Burners, of which the following is a specification.

This invention relates to improvements in oil burners and has for an object the provision of a burner having means for regulating the discharge opening so as to adapt the burner for use with different grades of oil.

Another object of the invention is the provision of an oil burner which includes means whereby the oil pressure may be regulated at the point of mixture of the oil with the steam of air.

Another object of the invention is the provision of means whereby steam or air entering the burner for mixture with the oil will be distributed over a large area of oil, whereby the latter will be evenly picked up and a more perfect mixture provided.

Another object of the invention is the provision of a burner which is economical in operation and which is capable of being easily and accurately regulated.

With the above and other objects in view, the invention further includes the following novel features and details of construction, to be hereinafter more fully described, illustrated in the accompanying drawings and pointed out in the appended claims.

In the drawings:—

Figure 1 is a plan view of a burner constructed in accordance with the invention and partly broken away.

Figure 2 is a longitudinal sectional view thereof parts being shown in elevation.

Figure 3 is an end view.

Figure 4 is a section on the line 4—4 of Figure 2.

Figure 5 is a detail perspective view of the head or movable section of the burner casing.

Referring to the drawings in detail wherein like characters of reference denote corresponding parts, the reference character 10 indicates the burner casing which is shown as of substantially flat rectangular shape in plan view and which includes a cover plate 11. This cover plate 11 is detachably secured in place by means of screws or similar fastening devices 12.

The casing is provided with a mixing chamber 13 which is supplied with oil and with steam or air so as to form a fuel mixture. The chamber 13 comprises top and bottom walls which are slightly spaced apart and side walls which are spaced relatively wide apart so that the mixing chamber is of a flat relatively wide configuration.

The casing includes a movable section or head 14 which closes one end of the casing and provides a section of the bottom wall of the mixing chamber. The side walls of the mixing chamber are substantially V-shaped as shown at 15 and provide a restricted portion and an outwardly flared discharge mouth 16.

The casing is provided with an inlet 17 for the admission of steam or air, the said inlet communicating with the mixing chamber at the inner end thereof. The casing is further provided with an oil inlet 18 which communicates with the mixing chamber through a passage 19. The section or head 14 also forms one wall of the passage 19.

Oil may be supplied from a suitable source to a pipe 20 which is connected in one end of the oil inlet 18 and which is provided with a coupling 21. Extending through the pipe 20 is a rod 22 which has one end swiveled in the section or head 14 as shown at 23. For this purpose the rod is provided with a head 24 which is received in an open ended slot 25 provided in the head or section 14. The opposite end of this rod has a threaded engagement with a block or nut 26 secured within the pipe 20 and passes through a suitable packing 27 with its outer end provided with a hand wheel 28. By manipulating the rod 22, the head or section 14 may be adjusted to vary the capacity of the passage 19 so that the pressure of oil entering the mixing chamber may be varied.

The air or steam enters the inner end of the mixing chamber and is distributed over a wide relatively thin layer of oil so that the oil will be evenly picked up and discharged through the mouth 16 and a perfect fuel mixture thus provided. In addition, by adjusting the section or head 14 of the casing so as to vary the capacity of the passage 19, the burner may be adapted for the use of different grades of oil.

The invention is susceptible of various changes in its form, proportions and minor details of construction and the right is herein reserved to make such changes as properly fall within the scope of the appended claims.

Having described the invention what is claimed is:

1. An oil burner of the character described comprising a substantially flat rectangular casing, a cover plate removably secured to the casing, the cover plate and casing defining a mixing chamber therebetween, a longitudinally movable section closing one end of the casing and forming the bottom wall of the discharge opening, said mixing chamber having an oil inlet communicating therewith adjacent one end of the movable section, a rod positioned in the oil passage and having one end swiveled in the movable section to vary the oil inlet, and said mixing chamber having an air or steam inlet communicating therewith.

2. An oil burner of the character described comprising a plan view substantially flat rectangular casing, a cover plate removably secured to the upper side of the casing, said cover plate having an integrally formed air or steam inlet upon the upper side thereof, a longitudinally movable section received in the forward end portion of the casing which includes substantially V-shaped side walls and defining an outwardly flared discharge portion upon the upper sides thereof, an oil pipe connected to the rear portion of the casing and having communication with the longitudinally movable section, and a longitudinally extending rod member having one end threaded within the oil inlet pipe and its opposite end swiveled within the longitudinally movable section whereby the mixture and entrance of oil with the air or steam within the mixing chamber defined in the upper portion of the longitudinally movable section may be determined or regulated by moving the longitudinally movable section inwardly and outwardly within the casing.

In testimony whereof I affix my signature.

FRANK J. TARR.